United States Patent
He et al.

(10) Patent No.: US 10,623,992 B2
(45) Date of Patent: Apr. 14, 2020

(54) SYSTEM AND METHOD FOR MOBILE NETWORK ACCESS LOAD BALANCING

(71) Applicant: A10 Networks, Incorporated, San Jose, CA (US)

(72) Inventors: Yichao He, San Jose, CA (US); Yang Yang, San Jose, CA (US); Ali Golshan, San Jose, CA (US)

(73) Assignee: A10 NETWORKS, INCORPORATED, San Jose, CA (US)

( * ) Notice: Subject to any disclaimer, the term of this patent is extended or adjusted under 35 U.S.C. 154(b) by 52 days.

(21) Appl. No.: 15/608,754

(22) Filed: May 30, 2017

(65) Prior Publication Data

US 2018/0352476 A1    Dec. 6, 2018

(51) Int. Cl.
| | |
|---|---|
| *H04W 28/08* | (2009.01) |
| *H04L 29/12* | (2006.01) |
| *H04L 12/26* | (2006.01) |
| *H04W 48/00* | (2009.01) |
| *H04W 88/16* | (2009.01) |

(52) U.S. Cl.
CPC ......... *H04W 28/08* (2013.01); *H04L 43/0817* (2013.01); *H04L 43/0876* (2013.01); *H04L 61/1511* (2013.01); *H04W 48/17* (2013.01); *H04W 88/16* (2013.01)

(58) Field of Classification Search
CPC .. H04W 28/08; H04W 88/16; H04L 43/0841; H04L 43/0882; H04L 61/1511; H04L 67/26

USPC ........................................................ 370/235
See application file for complete search history.

(56) References Cited

U.S. PATENT DOCUMENTS

| | | | | |
|---|---|---|---|---|
| 7,454,500 B1 * | 11/2008 | Hsu | ..................... | H04L 67/1008 709/203 |
| 7,720,997 B1 * | 5/2010 | Gourlay | .............. | H04L 12/5692 370/238 |
| 2002/0078209 A1 * | 6/2002 | Peng | ....................... | H04L 29/06 709/227 |
| 2008/0159244 A1 * | 7/2008 | Hunziker | ................. | H04Q 9/00 370/338 |
| 2013/0273974 A1 * | 10/2013 | Lea | ........................ | H01Q 21/24 455/562.1 |

\* cited by examiner

*Primary Examiner* — Stephen J Clawson

(57) ABSTRACT

System and method for mobile network access load balancing. In accordance with a first method embodiment, a method includes receiving, at a network access load balancing controller, performance status information from a mobile network access gateway. The method also includes calculating, at the network access load balancing controller, a dynamic performance score for the mobile network access gateway utilizing the performance status information and calculating, at the network access load balancing controller, a weighted ranking of dynamic performance scores of a plurality of mobile network access gateways. The method further includes assigning, based on the weighted ranking of dynamic performance scores, one of the plurality of mobile network access gateways to serve as a mobile network access gateway for a user element.

20 Claims, 11 Drawing Sheets

SYSTEM AND METHOD FOR MOBILE NETWORK ACCESS LOAD BALANCING

FIELD OF INVENTION

Embodiments of the present invention relate to the field of data networking. More specifically, embodiments of the present invention relate to systems and methods for mobile network access load balancing.

BACKGROUND

Due to the ever-increasing capacity demands on mobile broadband networks by ever-more numerous and capable mobile terminals, most mobile data networks utilize multiple mobile broadband network access gateways in order to distribute the load of mobile broadband usage among such multiple gateways. When a mobile terminal, for example, a smart phone, desires to access a mobile broadband data network, a mobility management entity (MME) system typically will request, using a domain name server/service (DNS) system, information about a plurality of mobile broadband network access gateways. The MME uses the information to select one of the gateways to serve the mobile terminal, for example, to connect the mobile terminal, via a mobile network, to the Internet. It is to be appreciated that the DNS system referred to herein is local to the exemplary mobile network, and is not to be confused with the DNS system utilized by the Internet to translate domain names to IP addresses.

The information provided from the DNS to the MME typically includes weights and priorities assigned to the mobile broadband network access gateways. Based on the received weight and priority information, the MME selects an appropriate gateway for the network access service requested by the mobile terminal. By selecting different gateways for different mobile terminals, according to the weight and priority information, the mobile management entity may achieve a usage load balance among the gateways.

However, under the conventional art, the weights and priorities of the various gateways are pre-determined, and do not reflect an actual temporal load of the gateways. For example, the weight and priority of a gateway are typically assigned fixed values, based on a gateway's characteristics. Accordingly, the gateways with assigned high priorities are often over-utilized, while gateways with assigned low priorities are under-utilized. When a mobility management entity selects a high priority yet over-utilized gateway to a mobile terminal, the mobile terminal will suffer degraded service from the over-utilized gateway.

SUMMARY OF THE INVENTION

Accordingly, what is needed are systems and methods for mobile network access load balancing. What is additionally needed are systems and methods for mobile network access load balancing that reflect the contemporaneous loading of each of a plurality of gateways. What is further needed are systems and methods for mobile network access load balancing that maximize network bandwidth across a plurality of gateways. There is a still further need for systems and methods for mobile network access load balancing that are compatible and complementary with existing systems and methods of mobile network access. Embodiments of the present invention provide these advantages.

In accordance with a first method embodiment of the present invention, a method includes receiving, at a network access load balancing controller, performance status information from a mobile network access gateway. The method also includes calculating, at the network access load balancing controller, a dynamic performance score for the mobile network access gateway utilizing the performance status information and calculating, at the network access load balancing controller, a weighted ranking of dynamic performance scores of a plurality of mobile network access gateways. The method further includes assigning, based on the weighted ranking of dynamic performance scores, one of the plurality of mobile network access gateways to serve as a mobile network access gateway for a user element.

In accordance with another embodiment of the present invention, a non-transitory computer-readable medium having instructions stored thereon that, responsive to execution by an electronic system, cause the electronic system to perform operations. The operations include receiving, at a network access load balancing controller, performance status information from a mobile network access gateway. The operations also include calculating, at the network access load balancing controller, a dynamic performance score for the mobile network access gateway utilizing the performance status information and calculating, at the network access load balancing controller, a weighted ranking of dynamic performance scores of a plurality of mobile network access gateways. The operations further include assigning, based on the weighted ranking of dynamic performance scores, one of the plurality of mobile network access gateways to serve as a mobile network access gateway for a user element.

In accordance with further embodiment of the present invention, a network access load balancing controller apparatus includes a processor, a computer readable media coupled to the processor configured to store processor instructions and data, and a network module configured to functionally couple the processor to a network. The network access load balancing controller apparatus is configured to receive performance status information from a mobile network access gateway indicative of a contemporaneous performance status of the mobile network access gateway. The network access load balancing controller apparatus is also configured to calculate a dynamic performance score for the mobile network access gateway utilizing the performance status information and to calculate a weighted ranking of dynamic performance scores of a plurality of mobile network access gateways. The network access load balancing controller apparatus is further configured to assign one of the plurality of mobile network access gateways to serve as a mobile network access gateway for a user element, based on the weighted ranking of dynamic performance scores.

BRIEF DESCRIPTION OF THE DRAWINGS

The accompanying drawings, which are incorporated in and form a part of this specification, illustrate embodiments of the invention and, together with the description, serve to explain the principles of the invention. Unless otherwise noted, the drawings are not drawn to scale.

DETAILED DESCRIPTION

Reference will now be made in detail to various embodiments of the present invention, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

System and Method for Mobile Network Access Load Balancing

The meaning of "non-transitory computer-readable medium" should be construed to exclude only those types of transitory computer-readable media which were found to fall outside the scope of patentable subject matter under 35 U.S.C. § 101, for instance as in In re Nuijten, 500 F.3d 1346, 1356-57 (Fed. Cir. 2007). The use of this term is to be understood to remove only propagating transitory signals per se from the claim scope and does not relinquish rights to all standard computer-readable media that are not only propagating transitory signals per se.

Embodiments in accordance with the present invention are described and illustrated in terms of a Long Term Evolution (LTE) telecommunications network. It is to be appreciated, however, that embodiments in accordance with the presently disclosed invention are well suited to other types of IP networks.

Figure 1:
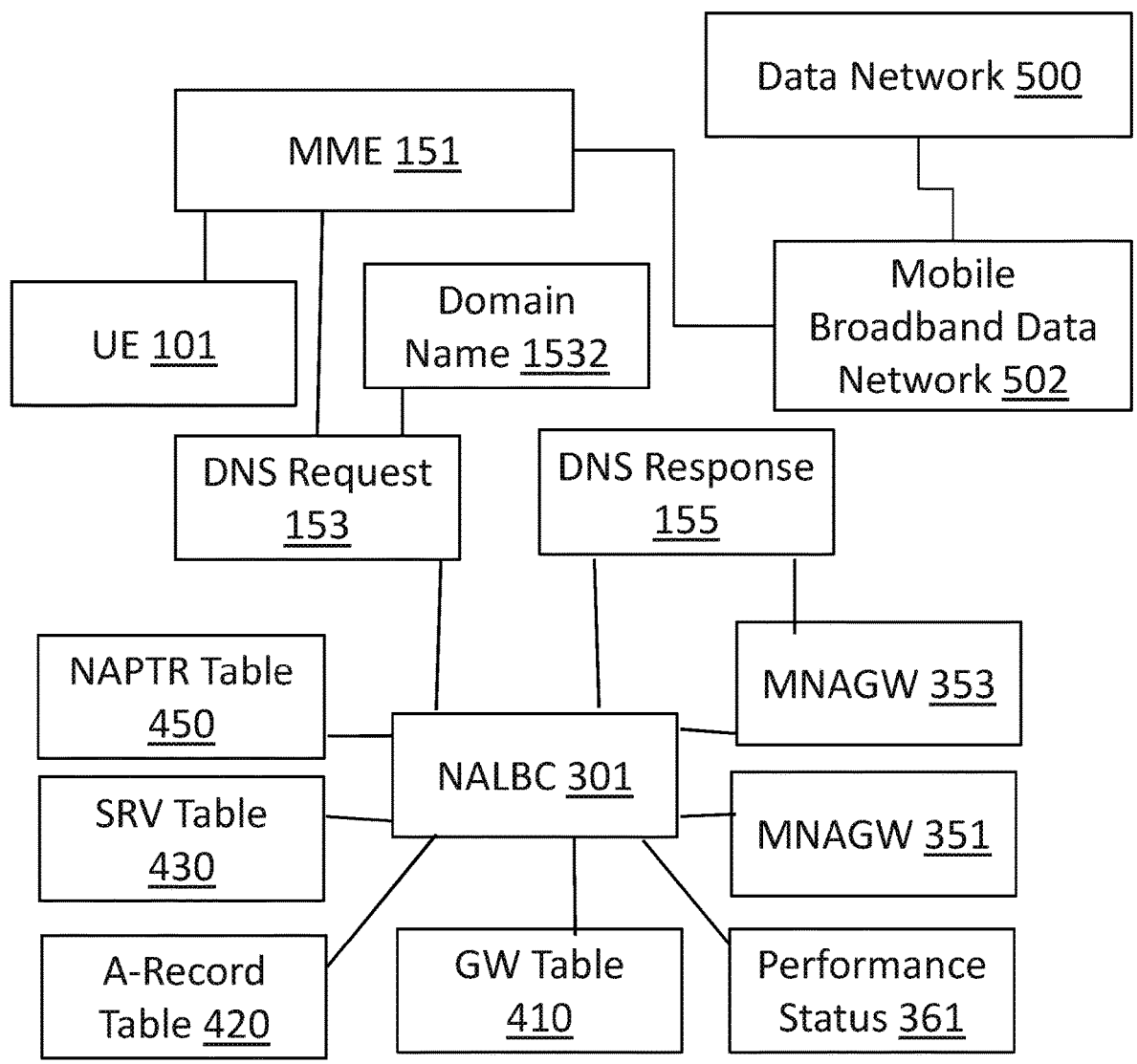
FIG. 1 illustrates an exemplary load balancing system to select a mobile network access gateway, in accordance with embodiments of the present invention.

FIG. 1 illustrates an exemplary load balancing system to select a mobile network access gateway, in accordance with embodiments of the present invention. In some embodiments, user element (UE) 101, e.g., a mobile phone, registers with mobile management entity (MME) 151 to connect to a mobile network access gateway (MNAGW) 353 in order to access mobile broadband data network 502, which may include the Internet. MME 151 may send a domain name service (DNS) request 153 to mobile network access load balancing controller (NALBC) 301 to request information about domain name 1532. NALBC 301 may connect to a plurality of mobile network access gateways (MNAGW), for example, MNAGW 351 and MNAGW 353. NALBC 301 maintains a name authority pointer (NAPTR) table 450, a service record (SRV) table 430, and an A-Record table 420. As is known, in general, a NAPTR table allows DNS to be used for lookup services for variety of resource names, an SRV table is used to specify location of services, and an A-Record table is used to map host names to IP addresses.

Network access load balancing controller (NALBC) 301 uses NAPTR table 450, SRV table 430, and A-Record table 420 to generate a DNS response 155 to DNS request 153. In some embodiments, NALBC 301 includes a gateway (GW) table 410. Gateway table 410 comprises a list of available gateways. NALBC 301 receives, from time to time, performance status information, for example, performance status 361 from MNAGW 351. The performance status information indicates the dynamic or contemporaneous performance status of the mobile network access gateway. NALBC 301 calculates a dynamic performance score for MNAGW 351 based on performance status 361, and updates the dynamic performance score corresponding to MNAGW 351 in GW table 410. Furthermore, NALBC 301 uses the updated GW table 410 to update A-Record table 420, SRV table 430, and NAPTR table 450, in order to generate DNS response 155.

In accordance with embodiments of the present invention, NALBC 301 receives DNS request 153, and retrieves requested domain name 1532 from DNS request 153. NALBC 301 matches domain name 1532 with NAPTR table 450, SRV table 430, and A-Record table 420, and selects a combination of one or more NAPTR entries from NAPTR table 450, optionally one or more SRV entries from SRV table 430, and one or more A-Record entries from A-Record table 420. NALBC 301 composes a DNS response 155 that include the selected entries, and sends DNS response 155 to MME 151. MME 151 retrieves the selected entries from DNS response 155 and determines that MNAGW 353, being referenced in the selected entries in DNS response 155, will be used for UE 101 to connect to access mobile broadband data network 502. Upon selecting MNAGW 353, MME 151 assists UE 101 to establish a mobile data access connection with MNAGW 353, where UE 101 accesses mobile broadband data network 502 using the mobile data access connection.

Figure 2:
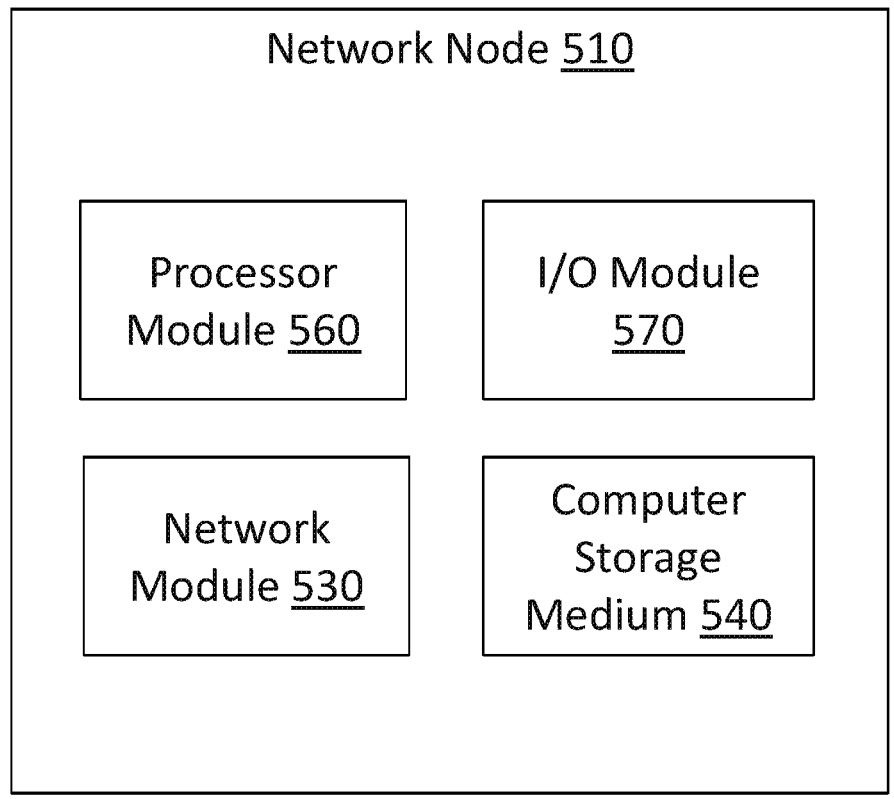
FIG. 2 illustrates an exemplary network node, which may be used as a platform to implement embodiments of the present invention.

FIG. 2 illustrates an exemplary network node 510, which may be used as a platform to implement embodiments of the present invention. Network node 510 may be, for example, a network computer, which may be, for example, a NALBC, a mobile network access gateway, a MME, a user entity, and/or a user terminal. In some embodiments, network node 510 includes a processor module 560, a network module 530, and a computer storage module 540 functionally coupled together. Processor module 560 includes one or more processors, which may comprise, for example, a micro-processor, an Intel processor, an AMD processor, a MIPS processor, an ARM-based processor, an IBM processor, a very long instruction word (VLIW) processor, a CISC processor, a RISC processor, a DSP processor and/or a graphics processor (GPU). Processor module 560 includes one or more processor cores embedded in a processor. Processor module 560 includes one or more embedded processors, and/or embedded processing elements in a Field Programmable Gate Array (FPGA), an Application Specific Integrated Circuit (ASIC), and/or a Digital Signal Processor (DSP). Network module 530 includes a network interface, for example, Ethernet, optical network interface, a wireless network interface, T1/T3 interface, a WAN and/or LAN interface.

In some embodiments, network module 530 includes a network processor. Storage module 540 may include, for example, RAM, DRAM, SRAM, SDRAM, magnetic RAM, ferroelectric RAM, resistive RAM, and/or memory utilized by processor module 560 and/or network module 530. Storage module 540 generally stores data utilized by processor module 560. Storage module 540 may include a hard disk drive, a solid state drive, a flash drive, an external disk, a DVD, a CD, and/or a readable external disk. Storage module 540 may store one or more computer programming instructions which when executed by processor module 560 and/or network module 530 implement one or more of the functionalities of the present invention. Network node 510 may include an input/output (I/O) module 570, which may include a keyboard, a keypad, a mouse, a touch screen, an eyeball tracker, a gesture based input sensor, a microphone, a physical and/or sensory input peripheral, a display, a speaker, and/or a physical and/or sensual output peripheral.

Referring once again to FIG. 1, in some embodiments, user element (UE) 101 may comprise a network node, e.g., network node 510 as illustrated in FIG. 2, coupled to mobile broadband data network 502. UE 101 can be a personal computer, a laptop computer, a tablet, a smartphone, a mobile phone, a netbook, a home gateway, a broadband gateway, a network appliance, a set top box, a media server, a personal media play, a personal digital assistant, a mobile hotspot, a networking switch, a server computer, a network storage computer, a mobile device, a telemetry device, or any computing device capable of network connectivity. UE 101 includes a network module connecting to a mobile data network, e.g., a cellular network.

In accordance with embodiments of the present invention, MME 151 comprises a network node, e.g., network node 510 as illustrated in FIG. 2, connected to mobile broadband data network 502 and data network 500. MME 151 may include functionalities of a DNS client. MME 151 connects to UE 101 over mobile broadband data network 502, and connects to MNAGW 353 over mobile broadband data network 502. MME 151 may assist UE 101 to establish a data session with MNAGW 353 to access mobile broadband data network 502. MME 151 connects to NALBC 301 over data network 500, so as to exchange DNS request 153 and DNS response 155 messages.

In accordance with embodiments of the present invention, MNAGW 351 or MNAGW 353 comprises a network node, e.g., network node 510 as illustrated in FIG. 2. MNAGW 351 or MNAGW 353 may be a broadband gateway, a network appliance, a traffic manager, a networking switch, and/or a server computer. MNAGW 351 or MNAGW 353 connects to the Internet, an enterprise virtual private network (VPN), a data center network, a service network, a network cloud, and/or a server farm. MNAGW 351 or MNAGW 353 allows UE 101 to access, via mobile broadband date network 502, the Internet, a VPN, a service network, a server farm, a data center network, and/or a network cloud.

In accordance with embodiments of the present invention, NALBC 301 may be a network node, e.g., network node 510 as illustrated in FIG. 2. NALBC 301 may include the functions of a server load balancer, and/or a DNS server. NALBC 301 may be a service gateway, a network appliance, a networking switch, and/or a server computer.

In accordance with embodiments of the present invention, data network 500 includes an Ethernet network, an ATM network, a wireless network, a Frame Relay network, an optical network, an IP network or any data communication network utilizing a physical layer, link layer capability, or network layer to carry data packets.

In accordance with embodiments of the present invention, mobile broadband data network 502 includes a radio area network, a cellular network, a wireless network, an Ethernet network, an ATM network, a Frame Relay network, an optical network, an IP network or any data communication network utilizing other physical layer, link layer capability or network layer to carry mobile data packets.

In accordance with embodiments of the present invention, domain name 1532 specifies an exact location in a tree hierarchy of the Domain Name System (DNS). Domain name 1532 may include all domain levels, including the top-level domain and the root zone. Domain name 1532 may include a character string.

Figure 3:
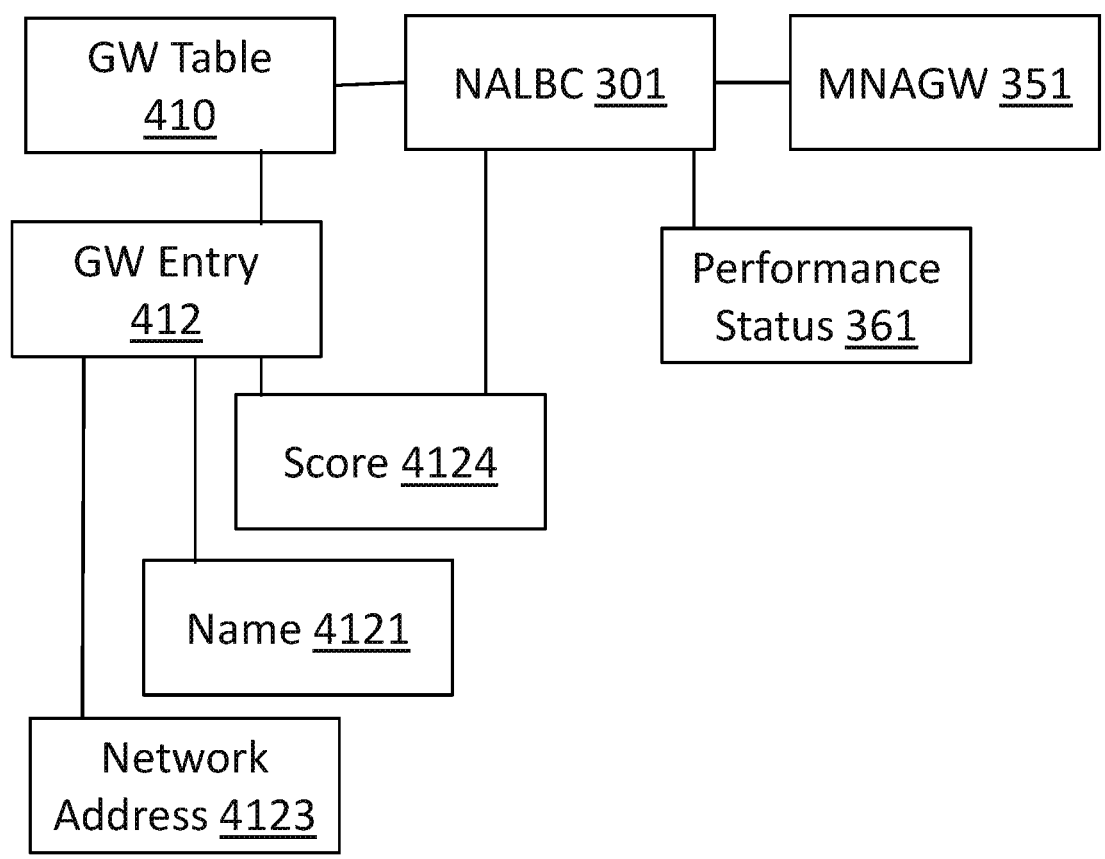
FIG. 3 illustrates a data flow diagram of an exemplary process for updating a mobile network access gateway table, in accordance with embodiments of the present invention.

FIG. 3 illustrates a data flow diagram of an exemplary process for updating a mobile network access gateway table, in accordance with embodiments of the present invention. In some embodiments, NALBC 301 updates GW table 410 by updating one or more entries in GW table 410. GW table 410 may include a GW entry 412 associated to MNAGW 351, and NALBC 301 updates GW entry 412. NALBC 301 may update GW entry 412 from time to time, and/or based on a pre-determined and/or pre-configured schedule. For example, NALBC 301 may update GW entry 412 every 60 seconds, every 150 seconds, every 5 minutes, and/or every hour. NALBC 301 may update GW entry 412 after receiving performance status 361 from MNAGW 351. NALBC 301 may update GW entry 412 after updating a previous GW entry in GW table 410. MNAGW 351 measures and collects performance status 361 and sends performance status 361. MNAGW 351 may collect performance status 361 from time to time, and/or based on a pre-configured schedule. MNAGW 351 may send performance status 361 from time to time, and/or according to a pre-configured schedule. NALBC 301 may receive performance status 361 from MNAGW 351 when MNAGW 351 makes performance status 361 available. A network access load balancing controller may request updates from a gateway and/or a gateway may send unsolicited updates to a network access load balancing controller.

In accordance with embodiments of the present invention, NALBC 301 retrieves GW entry 412 from GW table 410 and obtains a network address 4123 from GW entry 412. In some embodiments, NALBC 301 uses network address 4123 to connect to MNAGW 351, and collects a current performance status 361 from MNAGW 351. Network address 4123 may include one or more of an IP address, a link layer address, a TCP/UDP port number, or any data network layer address allowing NALBC 301 to establish a data session with MNAGW 351. Network address 4123 may include a secure session network address. Network address 4123 may include an application address, for example, a network management network address, a network administrative network address, of a network application in MNAGW 351 collecting performance status 361. After establishing a data session using network address 4123, NALBC 301 may issue a command to MNAGW 351 to collect performance status 361. NALBC 301 may issue a CLI command, a "show status" command, a SNMP get command, and/or a programming script containing a plurality of commands. MNAGW 351, upon receiving the command, collects performance status 361.

In some embodiments, performance status 361 includes one or more real time performance data of MNAGW 351, for example, CPU load percentage, active mobile network access connection load percentage, active mobile network access connection load percentage, ICMP echo responses packet lost percentage, GTP (GPRS tunneling protocol) echo responses packet lost percentage, memory usage percentage, and other usage percentage. NALBC 301 calculates a dynamic performance score 4124 based on performance status 361. NALBC 301 may calculate dynamic performance score 4124 to be a value between 0 and 100, as illustrated in Relation 1, below:

Dynamic performance score 4124=100−(30*connection_load_percentage−20*cpu_load_percentage−20*memory_usage_percentage−10*gtp_echo_packet_lost_percentage−10*icmp_echo_packet_lost_percentage−10*other_uage_percentage)   Relation 1

In accordance with embodiments of the present invention, dynamic performance score 4124 may be rounded and/or truncated to an integer value. Upon determining dynamic performance score 4124, NALBC 301 stores dynamic performance score 4124 into GW entry 412. In some embodiments, NALBC 301 updates previously stored dynamic performance score 4124 in GW entry 412 with currently calculated dynamic performance score 4124. NALBC 301 stores and/or updates GW entry 412 in GW table 410.

Upon updating GW table 410, NALBC 301 updates other tables, for example, A-Record table 420, SRV table 430, and/or NAPTR table 450 (FIG. 1) to be further described below.

Figure 4:
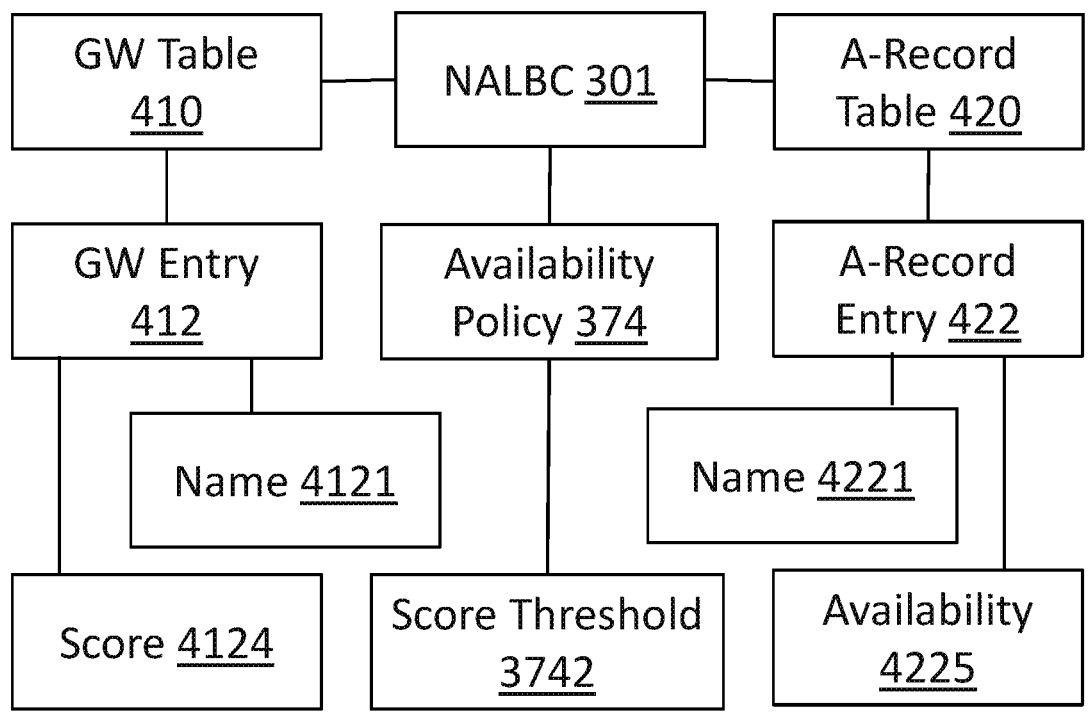
FIG. 4 illustrates a data flow diagram of an exemplary process for updating an A-Record table, in accordance with embodiments of the present invention.

FIG. 4 illustrates a data flow diagram of an exemplary process for updating an A-Record table, e.g., A-Record table 420 of FIG. 1, in accordance with embodiments of the present invention. In some embodiments, NALBC 301 updates A-Record table 420. NALBC 301 may update A-Record table 420 from time to time, and/or according to a pre-determined and/or pre-configured schedule. A-Record table 420 may include an A-Record entry 422, and NALBC 301 updates A-Record entry 422. A-Record entry 422 may include an A-Record name 4221. NALBC 301 matches A-Record name 4221 of A-Record entry 422 against GW table 410 and retrieves a GW entry 412 matching A-Record name 4221 to name 4121 of GW entry 412. NALBC 301 may retrieve dynamic performance score 4124 of GW entry 412 from GW table 410.

100421 In accordance with embodiments of the present invention, NALBC 301 includes an availability policy 374 which may be used to determine availability 4225 of A-Record entry 422. In some embodiments, availability policy 374 includes a dynamic performance score threshold 3742. Availability policy 374 may be pre-configured on NALBC 301. NALBC 301 compares dynamic performance score 4124 to dynamic performance score threshold 3742. If dynamic performance score 4124 is lower than dynamic performance score threshold 3742, NALBC 301 sets availability 4225 in A-Record entry 422 as, e.g., "No," "Down," "Unavailable," or "0" to indicate unavailability. If dynamic performance score 4124 is larger than dynamic performance score threshold 3742, NALBC 301 sets availability 4225 as, e.g., "Yes," "Up," "Available," or "1" to indicate availability. In one example, dynamic performance score 4124 has a value of 60 and dynamic performance score threshold 3742 is 50. NALBC 301 sets availability 4225 as "1." In one example, dynamic performance score 4124 has a value of 30 and dynamic performance score threshold 3742 is 40, NALBC 301 sets availability 4225 as "Down." Upon determining availability 4225, NALBC 301 updates A-Record entry 422 in A-Record table 420.

Figure 5:
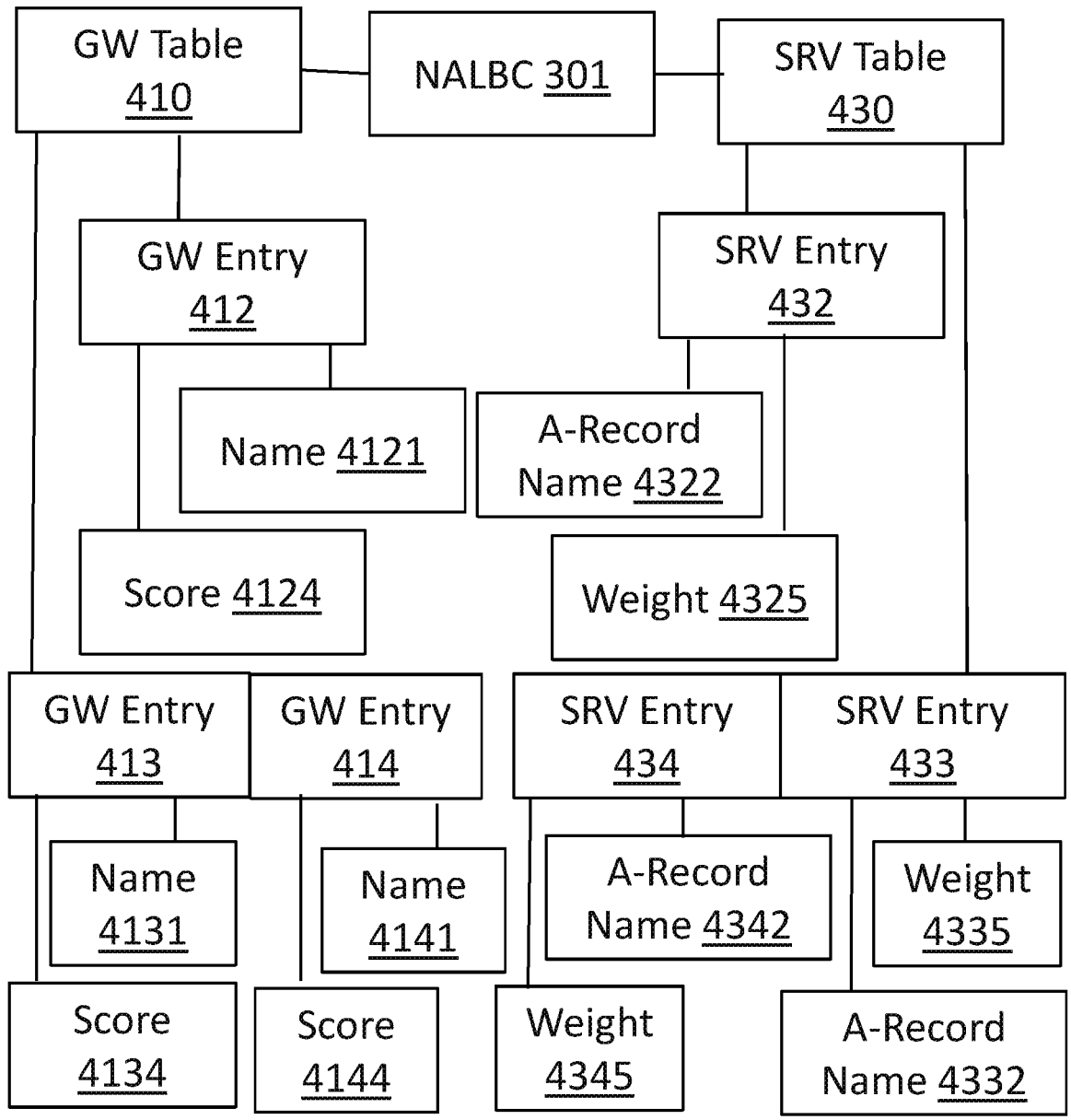
FIG. 5 illustrates a data flow diagram of an exemplary process for updating a service record table, in accordance with embodiments of the present invention.

100431 FIG. 5 illustrates a data flow diagram of an exemplary process for updating a service record table, in accordance with embodiments of the present invention. In some embodiments, NALBC 301 updates SRV table 430. NALBC 301 may update SRV table 430 from time to time, and/or according to a pre-determined and/or pre-configured schedule. SRV table 430 may include a SRV entry 432, and NALBC 301 updates SRV entry 432. SRV entry 432 may include an A-Record name 4322. NALBC 301 matches A-Record name 4322 against GW table 410 and retrieves a GW entry 412 matching A-Record name 4322 to name 4121 of the GW entry 412. NALBC 301 may obtain dynamic performance score 4124 of GW entry 412 and calculates weight 4325 of SRV entry 432, as illustrated in Relation 2, below:

Weight 4325=100*(dynamic performance score 4124/<sum of dynamic performance scores of all GW entries matching SRV table 430>   Relation 2

In the above embodiment, NALBC 301 matches all SRV entries in SRV table 430 against GW table 410 to determine all matching GW entries in GW table 410 where name of each matching GW entry matches an A-Record name of an SRV entry in SRV table 430. In some embodiments, SRV table 430 includes SRV entry 432, SRV entry 433, and SRV entry 434. NALBC 301 matches SRV table 430 against GW table 410 and determines that GW entry 412, GW entry 413, and GW entry 414 of GW table 410 match SRV entry 432, SRV entry 433, and SRV entry 434 respectively. Name 4121 of GW entry 412 matches A-Record 4322 of SRV entry 432. Name 4131 of GW entry 413 matches A-Record 4332 of SRV entry 433. Name 4141 of GW entry 414 matches A-Record name 4342 of SRV entry 434. In this embodiment, NALBC 301 calculates weight 4325, as illustrated in Relation 3, below:

weight 4325=100*(dynamic performance score 4124/ (dynamic performance score 4124 of GW entry 412+dynamic performance score 4134 of GW entry 413+dynamic performance score 4144 of GW entry 414).   Relation 3

In an exemplary embodiment, dynamic performance score 4124 has a value of 90, dynamic performance score 4134 has a value of 70, and dynamic performance score 4144 has a value of 50. NALBC 301 calculates weight 4325 to have a value of 100* 90 /(90+70+50)=42.857. In some embodiments, NALBC 301 uses an integer value of 43 for weight 4325.

In accordance with embodiments of the present invention, NALBC 301 stores updated SRV entry 432 to SRV table 430.

In accordance with embodiments of the present invention, NALBC 301 calculates and updates weights of all SRV entries in SRV table 430. NALBC 301 may calculate weight 4335 of SRV entry 433 to have a value of 100*70/(90+70+50)=31.818, or 32. NALBC 301 calculates weight 4345 of SRV entry 434 to have a value of 100*50/(90+70+50)=22.727 or 23.

Figure 6:
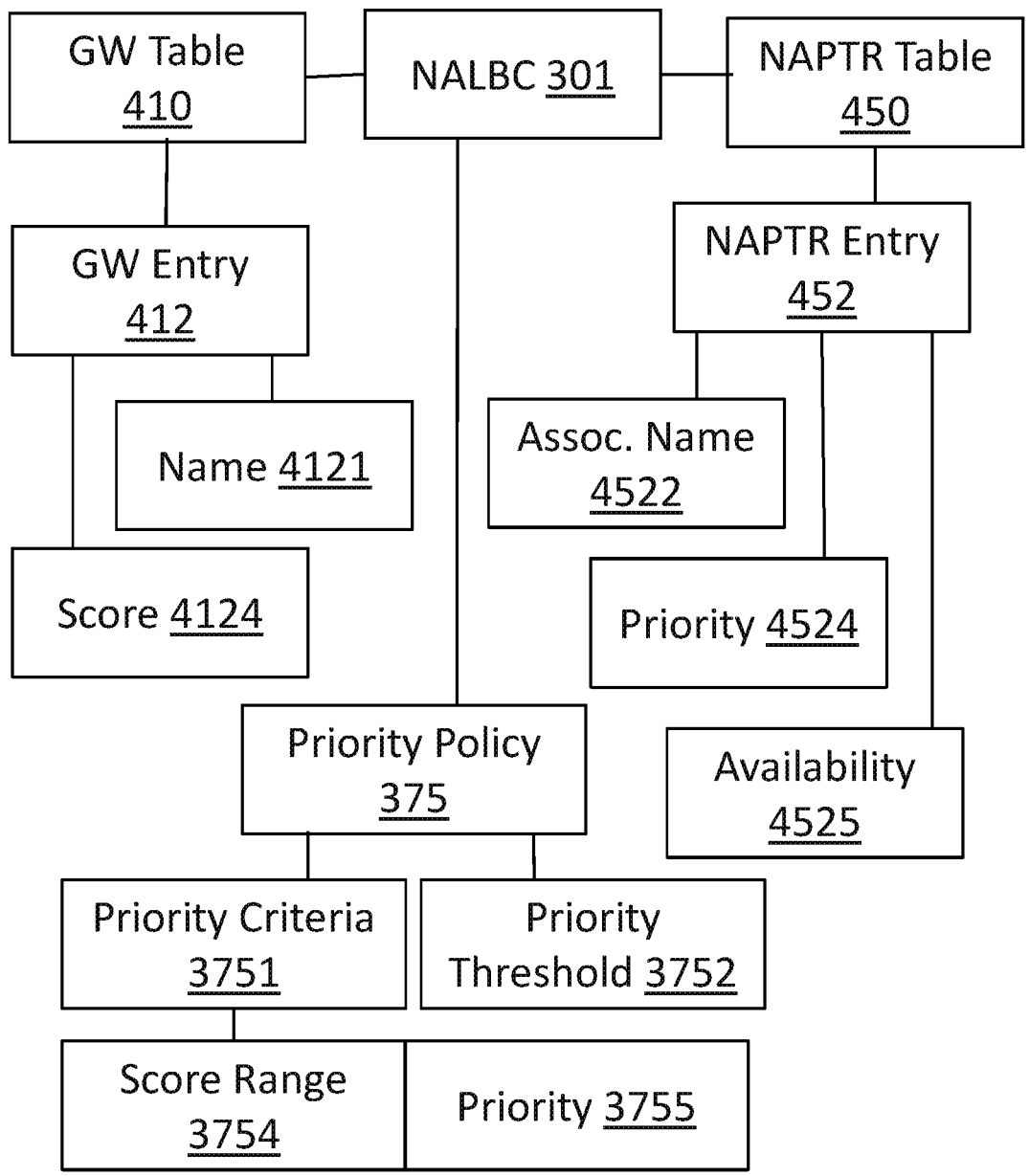
FIG. 6 illustrates a data flow diagram of an exemplary process for updating a name authority pointer table, in accordance with embodiments of the present invention.

FIG. 6 illustrates a data flow diagram of an exemplary process for updating a name authority pointer table, in accordance with embodiments of the present invention. In some embodiments, NALBC 301 updates NAPTR table 450. NALBC 301 may update NAPTR table 450 from time to time, and/or according to a pre-determined and/or pre-configured schedule. NAPTR table 450 may include a NAPTR entry 452, and NALBC 301 updates NAPTR entry 452. NAPTR entry 452 may include an associate name 4522. NALBC 301 matches associate name 4522 against GW table 410, and retrieves a matching GW entry 412 of GW table 410 where associate name 4522 matches name 4121 of GW entry 412. NALBC 301 may retrieve dynamic performance score 4124 of GW entry 412.

In accordance with embodiments of the present invention, NALBC 301 includes a priority policy 375 to be used to determine availability 4525 of NAPTR entry 452. In some embodiments, availability policy 374 includes a priority criteria 3751, which includes one or more dynamic performance score ranges, for example, dynamic performance score range 3754. Each dynamic performance score range may be associated with a priority, for example, priority 3755 associated with dynamic performance score range 3754. Priority policy 375 may be previously configured onto NALBC 301. NALBC 301 compares dynamic performance score 4124 to priority criteria 3751 to determine a matching dynamic performance score range 3754 and associated priority 3755. NALBC 301 sets priority 4524 to the matching priority 3755.

In some embodiments, priority criteria 3751 includes dynamic performance score ranges and priority levels as <90-100, "1">, <70-89, "2">, <50-69, "3">, <30-49, "4">, <0-29, "5">. For example, dynamic performance score 4124 may have a value of 90, for which NALBC 301 sets priority 4524 to "1." If dynamic performance score 4124 has a value of 72, NALBC 301 may set priority 4524 to "2." If dynamic performance score 4124 has a value of 24 and NALBC 301 may set priority 4524 to "5."

In accordance with embodiments of the present invention, priority criteria 3751 indicates setting priorities by ascending order of priorities of NAPTR entries in NAPTR table 450. In this embodiment, NALBC 301 matches all entries in NAPTR table 450 against GW table 410 to select one or more GW entries in GW table 410, each selected GW entry matching an NAPTR entry in NAPTR table 450. NALBC 301 sorts the NAPTR entries in NAPTR table 450, in ascending order according to the dynamic performance scores in the matching GW entries in GW table 410. NALBC 301 sets priority of a NAPTR entry, for example NAPTR entry 452, according to the sorted order of the matching GW entry of NAPTR entry 452. In some embodiments, dynamic performance score 4124 is ranked 3rd according to the ascending order. NALBC 301 sets priority 4524 of NAPTR entry 452 to the value "3."

In accordance with embodiments of the present invention, priority policy 375 further includes a priority threshold 3752. NALBC 301 uses priority threshold 3752 to determine if NAPTR entry 452 is available. In some embodiments priority 4524 may be higher than priority threshold 3752, and NALBC 301 sets availability 4525 of NAPTR entry 452 to "Unavailable," "Down," or "0" to indicate unavailability. Priority 4524 may be lower than priority threshold 3752, and responsive to such priority relationship, NALBC 301 may set availability 4525 to "Available," "Up," or "1" to indicate availability.

Upon setting values of priority 4524 and / or availability 4525 of NAPTR entry 452, NALBC 301 stores and updates if necessary NAPTR entry 452 in NAPTR table 450. In some embodiments, NALBC 301 updates other NAPTR entries in NAPTR table 450.

Figure 7:
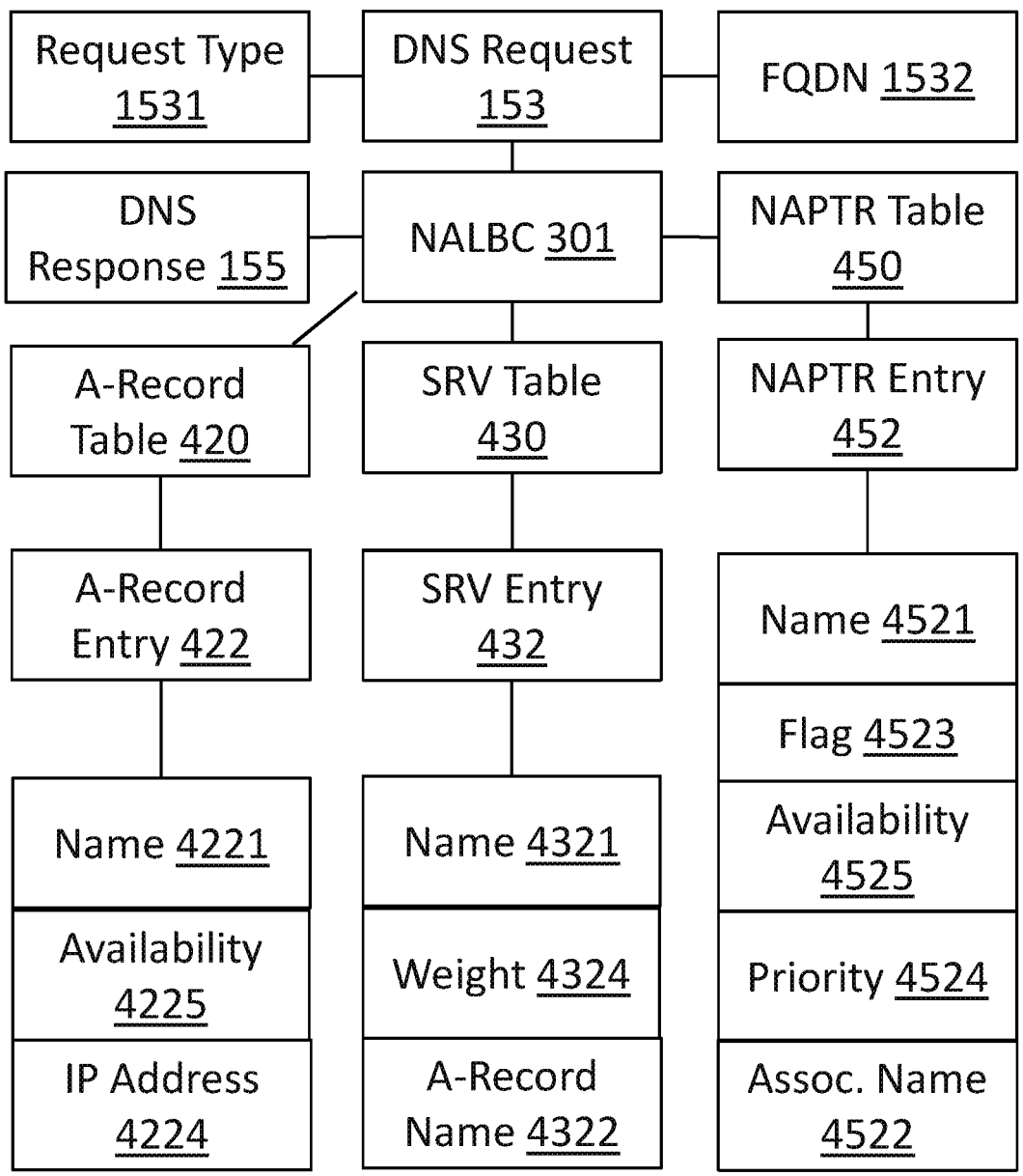
FIG. 7 illustrates a data flow diagram of an exemplary process for generating a DNS response to a DNS NAPTR request, in accordance with embodiments of the present invention.

FIG. 7 illustrates a data flow diagram of an exemplary process for generating a DNS response to a DNS NAPTR request, in accordance with embodiments of the present invention. In some embodiments, NALBC 301 receives a DNS request 153, which includes a fully qualified domain name (FQDN) 1532 and a request type 1531. NALBC 301 retrieves request type 1531 from DNS request 153. NALBC 301 may determine that request type 1531 indicates a request for "NAPTR" and NALBC 301 generates a DNS response 155 using NAPTR table 450.

In accordance with embodiments of the present invention, NALBC 301 retrieves FQDN 1532 from DNS request 153 and matches FQDN 1532 against NAPTR table 450 to one or more matching entries, for example, NAPTR entry 452. In some embodiments, NAPTR entry 452 includes a name 4521 matching FQDN 1532. NALBC 301 retrieves NAPTR entry 452 from NAPTR table 450, and processes NAPTR entry 452 to generate DNS response 155. NALBC 301 examines availability 4525 of NAPTR entry 452 to determine if NAPTR entry 452 is to be used for DNS response 155. If availability 4525 indicates unavailability, for example, "0," "Down," or "Unavailable." NALBC 301 may not use NAPTR entry 452.

In accordance with embodiments of the present invention, availability 4525 of NAPTR entry 452 indicates availability, for example, "1," "Available," or "Up." NALBC 301 further processes NAPTR entry 452. In some embodiments, NAPTR entry 452 includes flag 4523. NALBC 301 examines flag 4523. If flag 4523 indicates an "a" flag, NALBC 301 matches associate name 4522 of NAPTR entry 452 to A-Record table 420 and selects one or more matching entries, for example, A-Record entry 422 wherein A-Record name 4221 of A-Record entry 422 matches associate name 4522 of NAPTR entry 452. NALBC 301 examines availability 4225 of A-Record entry 422. If availability 4225 indicates unavailability, for example, "0," "Down," or "Unavailable." NALBC 301 may not use A-Record entry 422 for DNS response 155.

In some embodiments, availability 4225 indicates availability, for example, "1," "Available," or "Up." NALBC 301 generates an A-Record response entry in DNS response 155, using A-Record name 4221 and IP address 4224 included in A-Record entry 422. NALBC 301 may determine that NAPTR entry 452 matches an available A-Record entry used in DNS response 155. NALBC 301 generates a NAPTR response entry in DNS response 155, using name 4521, flag 4523, priority 4524, and associate name 4522 of NAPTR entry 452. NALBC 301 may determine that NAPTR entry 452 does not match any A-Record entry used in DNS response 155. In such a case, NALBC 301 may not use NAPTR entry 452 in generating DNS response 155.

In accordance with embodiments of the present invention, upon generating one or more NAPTR response entries for DNS response 155, NALBC 301 arranges the generated NAPTR response entries, according to the ascending order of their priorities, in DNS response 155. In some embodiments, NALBC 301 does not sort or arrange the order of the generated NAPTR response entries in DNS response 155.

In accordance with embodiments of the present invention, NALBC 301 determines flag 4523 of NAPTR entry 452, where availability of NAPTR entry 452 indicates availability, indicates an "s" flag, NALBC 301 uses associate name 4522 to match SRV table 430 to select one or more SRV entries, for example, SRV entry 432 where name 4321 of SVR entry 432 matches associate name 4522 of NAPTR entry 452. Upon selecting SRV entry 432 matching associate name 4522, NALBC 301 matches A-Record name 4322 of SRV entry 432 to A-Record table 420 to select one or more matching A-Record entries, for example, A-Record entry 422 where A-Record name 4221 of A-Record entry 422 matches A-Record name 4322 of SRV entry 432. In some embodiments, NALBC 301 determines availability 4225 of A-Record entry 422 indicates availability and NALBC 301 generates an A-Record response entry to be included in DNS response 155 for A-Record entry 422, using A-Record name 4221 and IP address 4224 of A-Record entry 422. NALBC 301 may determine that availability 4225 indicates unavailability, and does not include A-Record entry 422 in DNS response 155.

In accordance with embodiments of the present invention, NALBC 301 determines there is at least one A-Record response entry for an A-Record entry matching SRV entry 432. NALBC 301 generates an SRV response entry to be included in DNS response 155 for SRV entry 432 using name 4321, weight 4324, and A-Record name 4322 of SRV entry 432.

In accordance with embodiments of the present invention, NALBC 301 determines there is at least one SVR response entry for a SRV entry matching NAPTR entry 452. NALBC 301 generates an NAPTR response entry to be included in DNS response 155 for NAPTR entry 452 using name 4521, flag 4523, priority 4524, and associate name 4522 of NAPTR entry 452.

In accordance with embodiments of the present invention, NALBC 301 generates, to be included in DNS response 155, a combination of one or more NAPTR response entries for one or more NAPTR entries in NAPTR table 450, one or more SRV response entries for one or more SRV entries in SRV table 430, or one or more A-Record response entries for one or more A-Record entries in A-Record table 422. In some embodiments, NALBC 301 arranges, in DNS response 155, NAPTR response entries to be included first, followed by SRV response entries, and then by A-Record response entries. NALBC 301 may arrange the NAPTR response entries in ascending order of their priorities. NALBC 301 may arrange the SRV response entries in descending order of their weights. NALBC 301 may arrange the A-Record response entries according to a descending order of the dynamic performance scores of the corresponding A-Record entries. NALBC 301 may not arrange the NAPTR response entries, SRV response entries or A-Record response entries.

In accordance with embodiments of the present invention, NALBC 301 determines request type 1531 of DNS request 153 indicates a request for "SRV." NALBC 301 matches FQDN 1532 of DNS request 153 against SRV table 430 to select one or more SVR entries, for example, SVR entry 432 from SVR table 430 where name 4321 of SVR entry 432 matches FQDN 1532. Upon selecting SRV entry 432, NALBC 301 matches name 4321 of SRV entry 432 against A-Record table 420 to select one or more A-Record entries, from A-Record table 420, for example, A-Record entry 422 where A-Record name 4221 of A-Record entry 422 matches A-Record name 4322 of SRV entry 432. Upon selecting matching A-Record entry 422, NALBC 301 processes A-Record entry 422, if appropriate, to generate an A-Record response entry to be included in DNS response 155 for A-Record entry 422, as explained previously. NALBC 301 further generates, if appropriate, a SRV response entry, to be included in DNS response 155, for SRV entry 432, as described previously. In some embodiments, NALBC 301 processes all SRV entries from SRV table 430 matching FQDN and generates one or more A-Record response entries and one or more SRV response entries for DNS response 155. NALBC 301 may arrange the generated SRV response entries and A-Record entries in DNS response 155 as previously described.

In accordance with embodiments of the present invention, NALBC 301 determines request type 1531 of DNS request 153 indicates a request for "A Record." NALBC 301 matches FQDN 1532 to A-Record table 420 to select one or more A-Record entries from A-Record table 420, for example, A-Record entry 422. Upon selecting matching A-Record entry 422, NALBC 301 processes A-Record entry 422 to generate, if appropriate, an A-Record response entry to be included in DNS response 155, for A-Record entry 422, using A-Record name 4221, and IP address 4224 of A-Record entry 422. Upon generating a plurality of A-Record response entries to be included in DNS response, NALBC 301 arranges the plurality of A-Record response entries in DNS response 155 as previously described.

Figure 8:
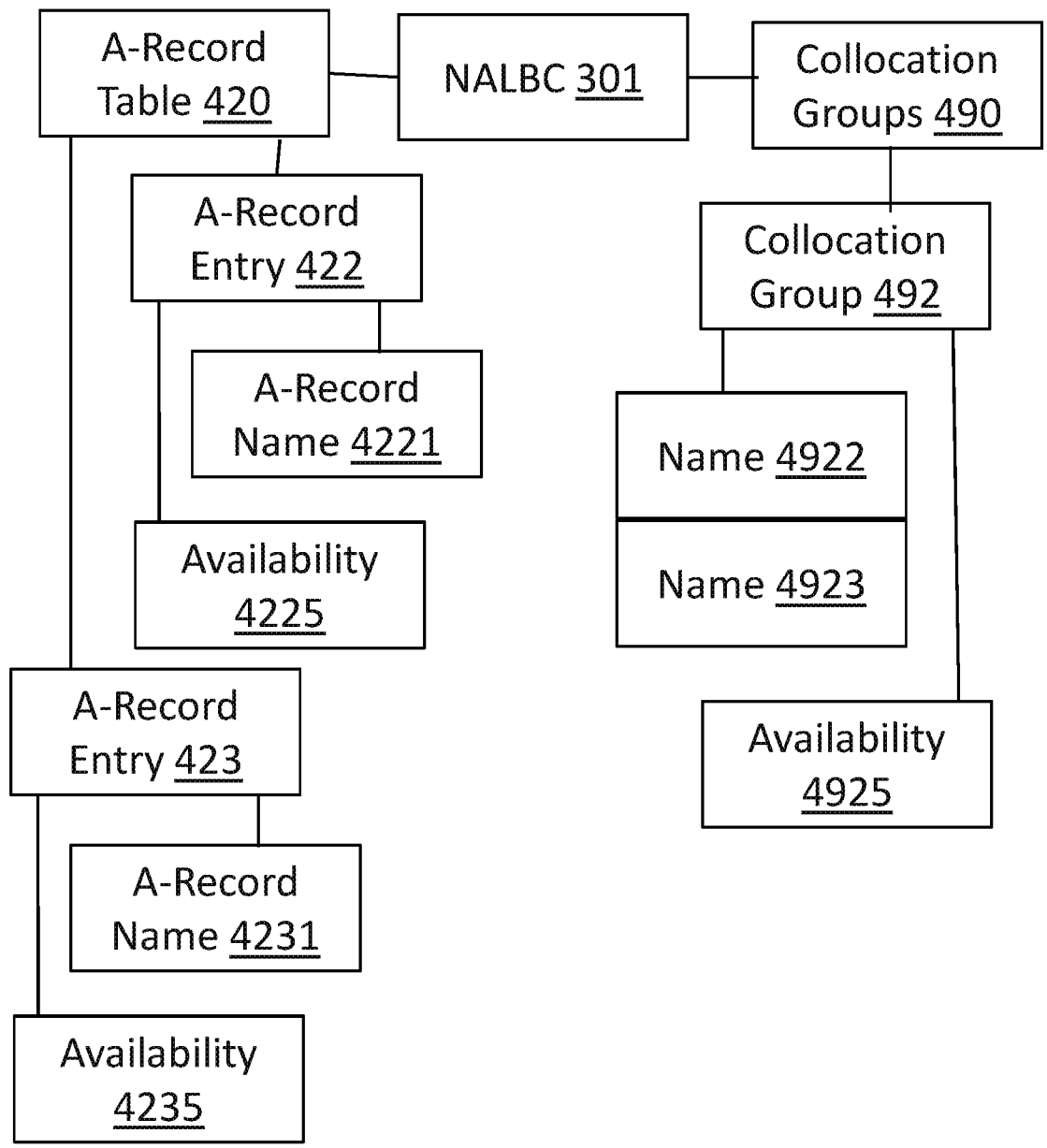
FIG. 8 illustrates a data flow diagram of an exemplary process for processing a plurality of collocation groups, in accordance with embodiments of the present invention.

FIG. 8 illustrates a data flow diagram of an exemplary process for processing a plurality of collocation groups, in accordance with embodiments of the present invention. In some embodiments, NALBC 301 includes collocation groups 490, which in turn includes a plurality of collocation group entries, for example, collocation group 492. Collocation group 492 includes name 4922 and name 4923 which are configured to refer to two different gateways referenced by two different A-Record entries. Name 4922 may refer to A-Record entry 422 and name 4922 matches A-Record name 4221 of A-Record entry 422, whereas name 4923 may refer to A-Record entry 423 and name 4923 matches A-Record name 4231 of A-Record entry 423.

In some embodiments, a network administrator may configure A-Record table 420 for a plurality of packet gateways (PGW) and service gateways (SGW) in a mobile broadband data network. The network administrator may configure collocation group 492 to refer to a PGW, referenced by A-Record entry 422, and a SGW, referenced by A-Record entry 423, where PGW and SGW are collocated in a same facility. In such a configuration, the network administrator desires to associate an availability of a PGW with an availability of the corresponding SGW, such that if one gateway is unavailable, the other gateway becomes unavailable to be chosen for a DNS request. The following description illustrates NALBC 301 to process collocation group 492 to achieve an effect desired by the network administrator.

In accordance with embodiments of the present invention, NALBC 301 determines availability 4925 of collocation group 492 based on availability 4225 of A-Record entry 422 and availability 4235 of A-Record entry 423. In some embodiments, when both availability 4225 and availability 4235 indicate availability, NALBC 301 sets availability 4925 as available, e.g., "Up," "Available," or "1" to indicate availability. If one or both of availability 4225 and availability 4235 indicates unavailability, NALBC 301 may set availability 4925 to indicate unavailability, or as "Down," "Unavailable," or "0." Upon setting availability 4925 of collocation group 492, NALBC 301 stores or updates collocation group 492 in collocation groups 490.

In accordance with embodiments of the present invention, NALBC 301 updates collocation groups 490 when NALBC 301 updates A-Record table 420, as illustrated in FIG. 3. In some embodiments, upon updating A-Record entry 422, NALBC 301 matches A-Record name 4221 of A-Record entry 422 with collocation groups 490 to select a matching collocation group 492 where name 4922 of collocation group 492 matches A-Record name 4221. Upon selecting collocation group 492, NALBC 301 matches name 4923 of collocation group 492 with A-Record table 420 to select a matching A-Record entry 423 where A-Record name 4231 of A-Record entry 423 matches name 4923. Upon selecting A-Record entry 423, NALBC 301 uses updated A-Record entry 422 and selected A-Record entry 423 to update collocation group 492 as previously described.

Figure 9:
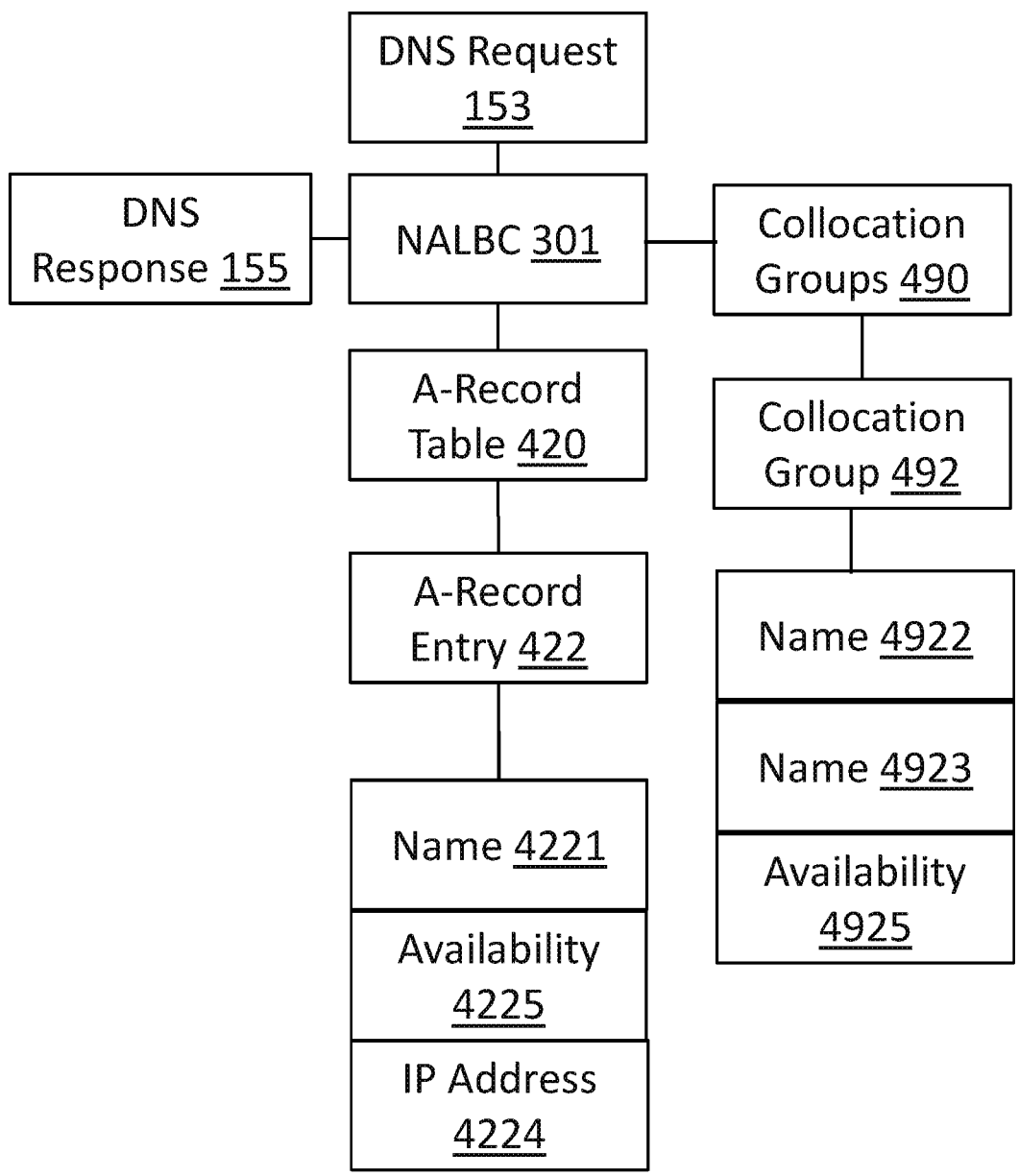
FIG. 9 illustrates a data flow diagram of an exemplary process for generating an A-Record response entry for DNS response using collocation groups, in accordance with embodiments of the present invention.

FIG. 9 illustrates a data flow diagram of an exemplary process for generating an A-Record response entry for DNS response using collocation groups, in accordance with embodiments of the present invention. Referring to FIG. 7 described earlier, NALBC 301 determines and processes A-Record entry 422 to generate an A-Record response entry for DNS response 155. In some embodiments, NALBC 301 determines availability 4225 of A-Record entry 422 indicates unavailability and does not use A-Record entry 422 to generate an A-Record response entry. NALBC 301 may determine availability 4225 of A-Record entry 422 indicates availability. NALBC 301 further examines collocation groups 490 to determine if A-Record entry 422 is to be used to generate an A-Record response entry.

In accordance with embodiments of the present invention, NALBC 301 matches A-Record name 4221 of A-Record entry 422 with collocation groups 490 to select a matching collocation group 492 where A-Record name 4221 matches either name 4922 or name 4923 of collocation group 492. Upon selected collocation group 492, NALBC 301 checks availability 4925 of collocation group 492. If availability 4925 indicates unavailability, NALBC 301 does not generate an A-Record response entry for A-Record entry 422. If availability 4925 indicates availability, NALBC 301 generates an A-Record response entry for A-Record entry 422 to be included in DNS response 155.

In accordance with embodiments of the present invention, NALBC 301, upon determining that A-Record entry 422, according to collocation groups 490, will be included in DNS response, proceeds to process SRV table 430 and NAPTR table 450 as illustrated in FIG. 7.

Figure 10:
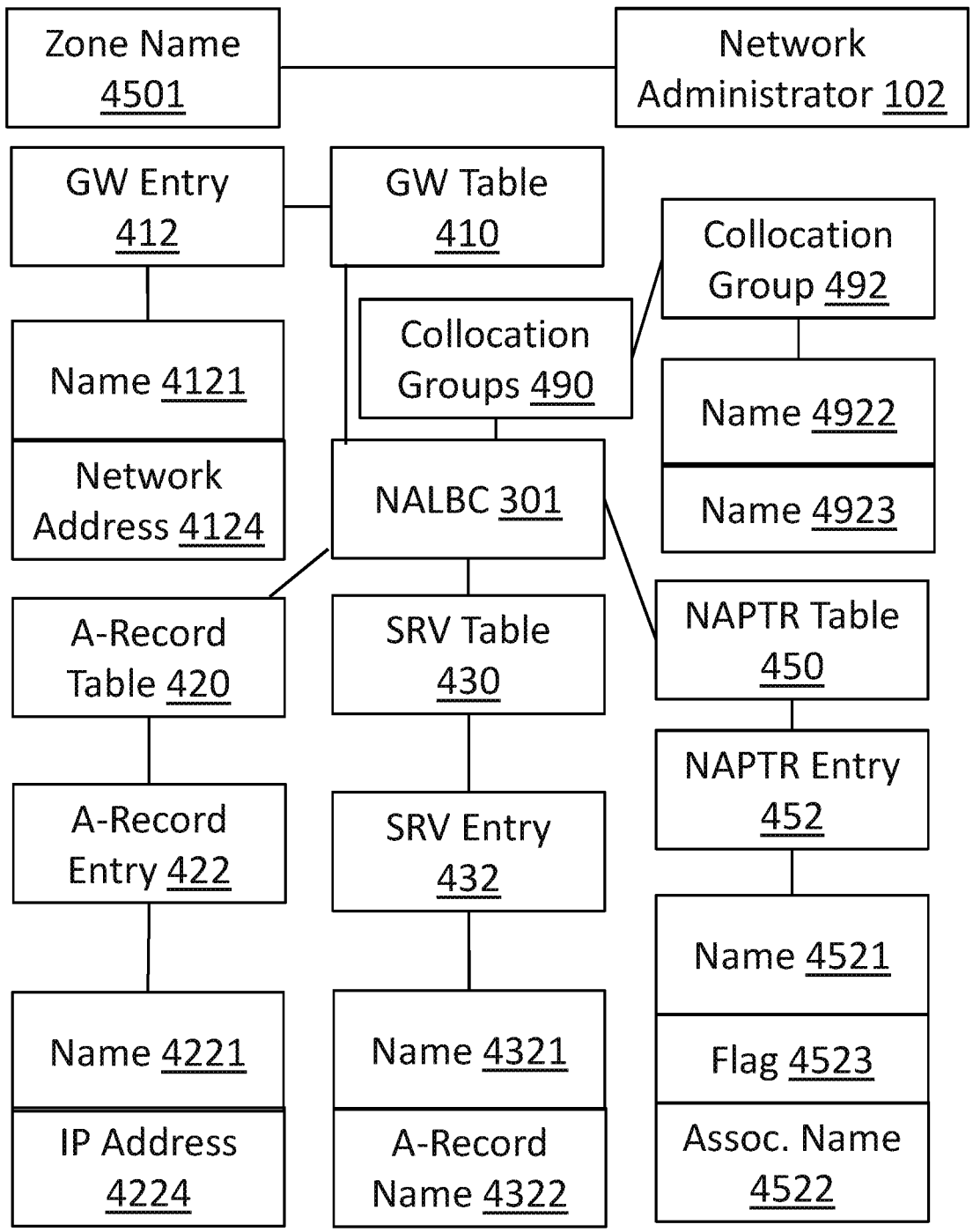
FIG. 10 illustrates a data flow diagram of an exemplary process for configuring a table, in accordance with embodiments of the present invention.

FIG. 10 illustrates a data flow diagram of an exemplary computer implemented process for configuring a table, in accordance with embodiments of the present invention. In some embodiments, network administrator 102 configures a plurality of tables, including GW table 410 A-Record table 420, SRV table 430, NAPTR table 450, and collocation groups 490 on NALBC 301. Network administrator 102 may include a network node, and/or a user using a network computer to configure the tables on NALBC 301. Network administrator 102 may send the table configuration using one or more files. Network administrator 102 may include one or more zone file configuration and sends the zone file configuration to NALCB 301.

In accordance with embodiments of the present invention, network administrator 102 instructs NALBC 301 to configure and/or create NAPTR table 450. Network administrator 102 then instructs NALBC 301 to configure and/or create one or more entries, for example, entry NAPTR entry 452 in NAPTR table 450. Network administrator 102 configures NAPTR entry 452 to include name 4521, flag 4523, and associate name 4522. In some embodiments, network administrator 102 configures NAPTR table 450 to be associated to a zone name 4501. In this embodiment, network administrator 102 instructs NALBC 301 to use zone name 4501 as name for all configured NAPTR entries in NAPTR table 450.

In accordance with embodiments of the present invention, network administrator 102 instructs NALBC 301 to configure and/or create SRV table 430. Network administrator 102 then instructs NALBC 301 to configure and/or create one or more entries, for example, entry SRV entry 432 in SRV table 430. Network administrator 102 configures SRV entry 432 to include name 4321 and A-Record name 4322.

In accordance with embodiments of the present invention, network administrator 102 instructs NALBC 301 to configure and/or create A-Record table 420. Network administrator 102 then instructs NALBC 301 to configure and/or create one or more entries, for example, entry A-Record entry 422 in A-Record table 420. Network administrator 102 configures A-Record entry 422 to include A-Record name 4221 and IP address 4224.

In accordance with embodiments of the present invention, network administrator 102 instructs NALBC 301 to configure and/or create GW table 410. Network administrator 102 then instructs NALBC 301 to configure and/or create one or more entries, for example, entry GW entry 412 in GW table 410. Network administrator 102 configures GW entry 412 to include name 4121 and network address 4124.

In accordance with embodiments of the present invention, network administrator 102 instructs NALBC 301 to configure and/or to create collocation groups 490. Network administrator 102 then instructs NALBC 301 to configure and/or create one or more collocation group entries, for example, collocation group 492 in collocation groups 490. Network administrator 102 configures collocation group 492 to include name 4922 and name 4923.

In accordance with embodiments of the present invention, zone name 4501 may be configured to associate to a mobile broadband service name, for example, mobile access point name (APN).

In accordance with embodiments of the present invention, network administrator 102 also configures one or more policies used by NALBC 301 to set priorities and availabilities. These policies include priority policy, e.g., as illustrated in FIG. 6, and availability policy, e.g., as illustrated in FIG. 4.

Figure 11:
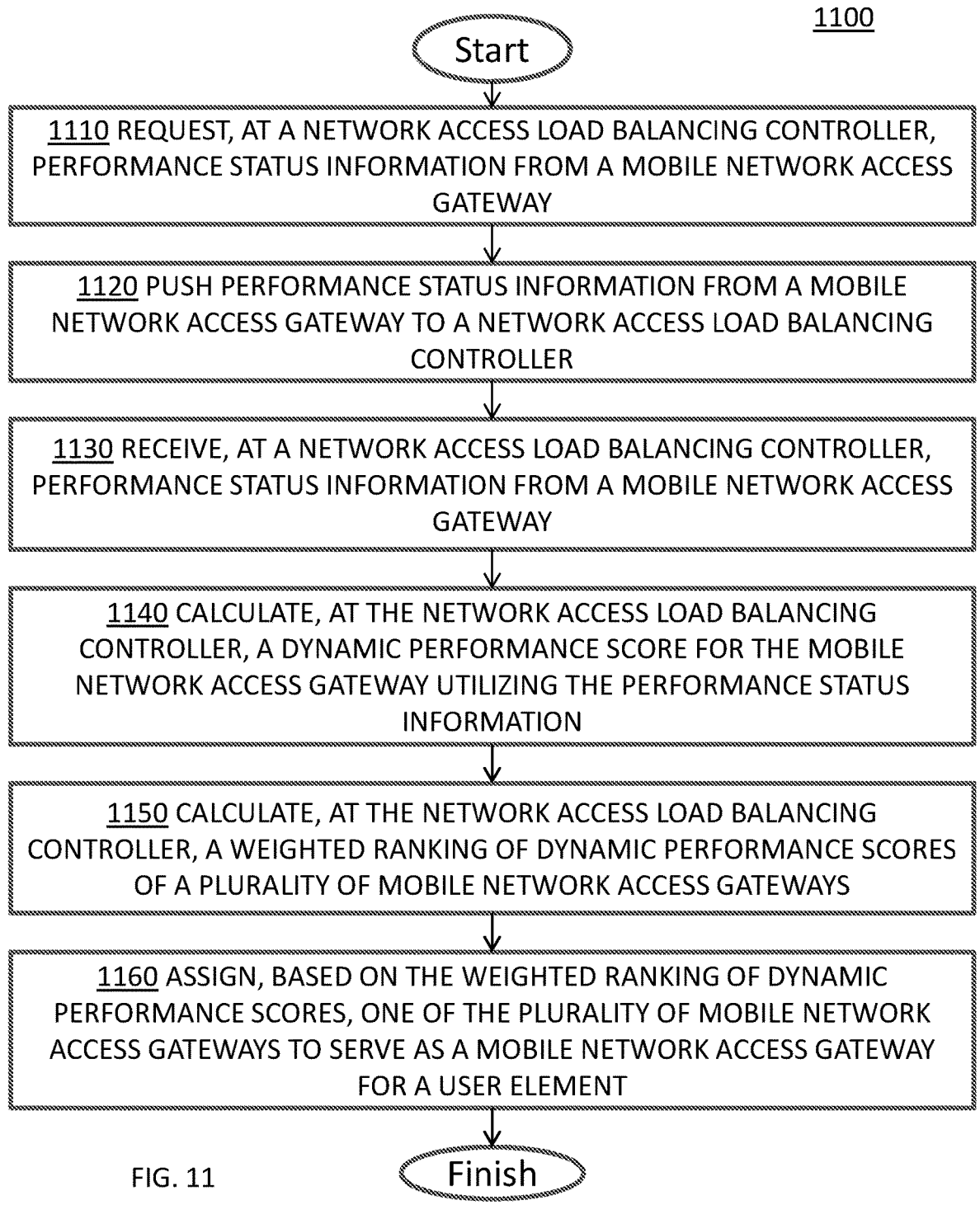
FIG. 11 illustrates a method, in accordance with embodiments of the present invention.

FIG. 11 illustrates a computer-controlled method 1100, in accordance with embodiments of the present invention. In optional 1110, a network access load balancing controller requests performance status information from a mobile network access gateway. In optional 1120, a mobile network access gateway pushes the performance status information to a network access load balancing controller. In 1130, a network access load balancing controller, e.g., network access load balancing controller 301 of FIG. 1, receives performance status information, e.g., performance status 361 of FIG. 1, from a mobile network access gateway, e.g., mobile network access gateway 351 of FIG. 1. The performance status information indicates the dynamic or contemporaneous performance status of the mobile network access gateway. The receipt of performance status information from the mobile network access gateway may be responsive to a request from the network access load balancing controller, in some embodiments. The performance status information may be received at the network access load balancing controller without being requested by the network access load balancing controller. For example, the performance status information is "pushed" to the network access load balancing controller.

In 1140, the network access load balancing controller calculates a dynamic performance score for the mobile network access gateway utilizing the performance status information. In 1150, the network access load balancing controller calculates a weighted ranking, e.g., weight 4325 of FIG. 5, of the dynamic performance scores of a plurality of mobile network access gateways.

In 1160, based on said weighted ranking, the network access load balancing controller assigns one of said plurality of mobile network access gateways to serve as a mobile network access gateway for a user element. The network access load balancing controller may identify the one of said plurality of mobile network access gateways in a domain name service response to a mobile management entity, e.g., NDS response 155 to MME 151 of FIG. 1.

Embodiments in accordance with the present invention provide systems and methods for mobile network access load balancing. In addition, embodiments in accordance with the present invention provide systems and methods for mobile network access load balancing that reflect the contemporaneous loading of each of a plurality of gateways. Further, embodiments in accordance with the present invention provide systems and methods for mobile network access load balancing that maximize network bandwidth across a plurality of gateways. Still further, embodiments in accordance with the present invention provide systems and methods for mobile network access load balancing that are compatible and complementary with existing systems and methods of mobile network access.

Various embodiments of the invention are thus described. While the present invention has been described in particular embodiments, it should be appreciated that the invention should not be construed as limited by such embodiments, but rather construed according to the below claims.

What is claimed is:

1. A method comprising:
    receiving, at a network access load balancing controller, performance status information of a mobile network access gateway;
    calculating, at said network access load balancing controller, a dynamic performance score for the mobile network access gateway utilizing the performance status information;
    calculating, at said network access load balancing controller, a weighted ranking of dynamic performance scores of a plurality of mobile network access gateways; and
    assigning, based on said weighted ranking of dynamic performance scores, one of said plurality of mobile network access gateways to serve as a mobile network access gateway for a user element.

2. The method of claim 1 further comprising said network access load balancing controller requesting said performance status information from said mobile network access gateway.

3. The method of claim 1 further comprising pushing said performance status information from said mobile network access gateway is pushed to said network access load balancing controller.

4. The method of claim 1 wherein said assigning comprises identifying the one of said plurality of mobile network access gateways in a domain name service (DNS) response to a mobile management entity.

5. The method of claim 1 wherein said performance status information comprises a connection load percentage of said mobile network access gateway.

6. The method of claim 1 wherein said performance status information comprises a processor load percentage of said mobile network access gateway.

7. The method of claim 1 wherein said assigning comprises assigning the one of said plurality of mobile network access gateways having a highest weighted ranking of dynamic performance scores to serve as a mobile network access gateway for a user element.

8. A non-transitory computer-readable medium having instructions stored thereon that, responsive to execution by an electronic system, cause said electronic system to perform operations comprising:
    receiving, at a network access load balancing controller, performance status information of a mobile network access gateway;
    calculating, at said network access load balancing controller, a dynamic performance score for the mobile network access gateway utilizing the performance status information;
    calculating, at said network access load balancing controller, a weighted ranking of dynamic performance scores of a plurality of mobile network access gateways;
    assigning, based on said weighted ranking of dynamic performance scores, one of said plurality of mobile network access gateways to serve as a mobile network access gateway for a user element; and
    balancing the load across said plurality of mobile network access gateways reflective of the contemporaneous loading of each of the plurality of mobile network access gateways.

9. The non-transitory computer-readable medium of claim 8 wherein said network access load balancing controller requests said performance status information from said mobile network access gateway.

10. The non-transitory computer-readable medium of claim 8 wherein said performance status information is received from said mobile network access gateway independent of a request from said network access load balancing controller.

11. The non-transitory computer-readable medium of claim 8 wherein said assigning comprises identifying the one of said plurality of mobile network access gateways in a domain name service (DNS) response to a mobile management entity.

12. The non-transitory computer-readable medium of claim 8 wherein said performance status information comprises a memory usage percentage of said mobile network access gateway.

13. The non-transitory computer-readable medium of claim 8 wherein said performance status information comprises a general packet radio services (GPRS) tunneling protocol echo responses packet lost percentage of said mobile network access gateway.

14. The non-transitory computer-readable medium of claim 8 wherein said assigning comprises assigning the one of said plurality of mobile network access gateways based on its inclusion in a highest priority level.

15. A network access load balancing controller system comprising:
    a network access load balancing controller;
    a processor;
    a computer readable media coupled to said processor configured to store processor instructions and data;
    a network module configured to functionally couple the processor to a network, wherein said network access load balancing controller is configured to:
    receive performance status information of a mobile network access gateway indicative of a contemporaneous performance status of the mobile network access gateway;
    calculate a dynamic performance score for the mobile network access gateway utilizing the performance status information;

calculate a weighted ranking of dynamic performance scores of a plurality of mobile network access gateways; and assign one of said plurality of mobile network access gateways to serve as a mobile network access gateway for a user element, based on said weighted ranking of dynamic performance scores.

16. The system of claim 15 wherein said network access load balancing controller is further configured to request said performance status information from said mobile network access gateway.

17. The system of claim 15 wherein said network access load balancing controller is further configured to request said performance status information from said mobile network access gateway according to a time-based schedule.

18. The system of claim 15 wherein said network access load balancing controller is further configured to assign one of said plurality of mobile network access gateways to serve as a mobile network access gateway for a user element responsive to a domain name service (DNS) request.

19. The system of claim 15 wherein said network access load balancing controller is further configured to update a stored gateway table entry corresponding to the mobile network access gateway based on the dynamic performance score for the mobile network access gateway.

20. The system of claim 19 wherein said stored gateway table comprises an A-record table.

* * * * *